United States Patent [19]

Malloy

[11] 4,144,219
[45] Mar. 13, 1979

[54] POLYURETHANE ADHESIVE COMPOSITION AND USE THEREOF

[75] Inventor: John F. Malloy, Albany, N.Y.

[73] Assignee: Norton Company, Worcester, Mass.

[21] Appl. No.: 755,959

[22] Filed: Jan. 3, 1977

Related U.S. Application Data

[60] Division of Ser. No. 695,381, Jun. 14, 1976, Pat. No. 4,027,435, which is a continuation-in-part of Ser. No. 630,653, Nov. 10, 1975, abandoned, which is a continuation of Ser. No. 369,482, Jun. 13, 1973, abandoned, which is a continuation-in-part of Ser. No. 253,570, May 15, 1972, Pat. No. 3,872,629, which is a continuation-in-part of Ser. No. 34,105, May 4, 1970, abandoned, and Ser. No. 233,572, Mar. 10, 1972, Pat. No. 3,763,604, which is a continuation-in-part of Ser. No. 103,148, Dec. 31, 1970, abandoned, and Ser. No. 822,934, Mar. 8, 1969, abandoned.

[51] Int. Cl.$^2$ .................... C08K 5/02; C08K 5/03; C08L 75/04; C09J 3/16
[52] U.S. Cl. ..................... 260/33.8 UB; 156/331; 156/332; 206/389; 260/858; 260/859 R; 428/261
[58] Field of Search ........... 260/33.8 UB, 858, 859 R; 156/331, 332

[56] References Cited

U.S. PATENT DOCUMENTS

| | | | |
|---|---|---|---|
| 3,228,820 | 1/1966 | Samson | 156/331 |
| 3,252,848 | 5/1966 | Borsellino | 156/331 |
| 3,637,359 | 1/1972 | Malloy et al. | 260/858 |
| 3,770,555 | 11/1973 | Gladstone et al. | 260/858 |

*Primary Examiner*—Ronald W. Griffin
*Attorney, Agent, or Firm*—Arthur A. Loiselle, Jr.

[57] ABSTRACT

An adhesive composition which, in the preferred aspects of the invention, is a partially cured reaction product of the composition in the form of a dried, preformed film that is heat-activatable, is provided comprising in admixture a poly-functional active hydrogen containing component consisting of, in combination, a hydroxyl terminated polyurethane polyester having a hydroxyl number no greater than about 15 and a member containing at least difunctional active hydrogen having an active hydrogen equivalent weight of at least about 27 and less than about 500, a component having available free isocyanate groups, and a fourth component such as a chlorinated aliphatic hydrocarbon, a chlorinated aromatic hydrocarbon, or an alkylated polystyrene. The partially cured, preformed adhesive film of this invention permits joint formation under pressure at relatively low temperatures and over a relatively wide temperature range, thereby making it possible to join together various materials which would otherwise present a problem in joining because of their lack of heat resistance. Joints formed have unusually high resistance to flexural fatigue.

11 Claims, 4 Drawing Figures

POLYURETHANE ADHESIVE COMPOSITION AND USE THEREOF

CROSS-REFERENCE TO RELATED APPLICATIONS

This application is a division of application Ser. No. 695,381 filed on June 14, 1976 now U.S. Pat. No. 4,027,435; which is a continuation-in-part of application Ser. No. 630,653 filed Nov. 10, 1975 now abandoned; which is a continuation of application Ser. No. 369,482 filed June 13, 1973 now abandoned; which is a continuation-in-part of application Ser. No. 253,570 filed May 15, 1972 U.S. Pat. No. 3,872,629; which is a continuation-in-part of application Ser. No. 34,105 filed May 4, 1970 now abandoned, and application Ser. No. 233,572 filed Mar. 10, 1972, U.S. Pat. No. 3,763,604; the latter application is a continuation-in-part of application Ser. No. 103,148 filed Dec. 31, 1970 now abandoned, and application Ser. No. 822,934 filed May 8, 1969 now abandoned.

BACKGROUND OF THE INVENTION (1) Field of the Invention

This invention relates to an improved polyurethane adhesive composition and more particularly to a dried, partially cured heat-activatable, preformed adhesive film of such an adhesive composition, to its method of manufacture, and its use in the joining together of two adjacent surfaces. More particularly, the invention relates to the splicing together of two free ends of coated abrasive material and, still more particularly, to the splicing of abrasive material as in the formation of endless abrasive belts.

(2) Description of the Prior Art

Coated abrasive belts are manufactured, in general, by adhesively joining together the free ends of strips of coated abrasive sheet material of a suitable length and width. The demands on an adhesive used in the formation of endless abrasive belts are severe, as a coated abrasive belt during use is subjected to relatively high tensile and flexural forces. Thus, any adhesive composition used in the formation of abrasive belt joints must be tough and durable, in addition to providing good adhesion (high peel strength) with the abrasive material, to prevent delamination of the belt joint upon being subjected to severe flexing conditions, especially when running over a small diameter contact roll. Moreover, the adhesive used in forming the joint must often be resistant to heat, water, lubricants, and other cutting fluids encountered in abrading operations. An adhesive composition found highly suitable for use in the manufacture of endless abrasive belts, and meeting many of the above-disclosed requirements, is a polyurethane composition. Such a composition, in general, involves as the essential components an isocyanate and an isocyanate reactive compound, i.e., a poly-functional active hydrogen containing component.

Polyurethane adhesive compositions, in general, must be used in a relatively short time after formulation and for that reason, among others, have not been overly accepted for use in certain industrial applications. Various means have been suggested whereby a composition of longer shelf or pot life would be provided, one of which is disclosed in U.S. Pat. No. 3,637,359 for Coated Abrasive Belt Overlap Joint. Therein, chlorinated aliphatic and aromatic hydrocarbons and alkylated polystyrene resins are disclosed for accomplishing this purpose. In addition to teaching the incorporating of e.g., chlorinated aliphatic hydrocarbons for longer pot life, it is disclosed that, where pot life is of lesser concern, greater initial joint strength is attained and higher joining temperatures can be used, if a catalyst is also incorporated in the polyurethane composition.

Although liquid adhesive compositions of glue and various resinous and rubbery like materials have long been used in the manufacture of abrasive belts, their use is attendant with certain disadvantages in addition to involving messiness and potential errors in preparation and use from operator to operator. One disadvantage associated with the use of a liquid adhesive composition is that it, in general, requires a "dwell time" for, among other things, the removal of solvent. Thus, an operator must apply the adhesive composition to the surface or surfaces to be joined, wait for a certain period of time to pass in order for the solvent to evaporate and, in some instances, for the adhesive material to cure to some desired point, before joining the ends together for joint formation.

Curing of some adhesive materials to some degree before joining the adhesive coated surfaces together is absolutely necessary in order that an inordinate amount of time is not taken, e.g., for a press curing cycle and, most importantly, so that the adhesive material will have sufficient cohesive strength prior to pressing that it will not be squeezed out during pressing thus resulting in an adhesive starved joint area and therefore a joint with inferior bond strength.

On the other hand, the "open time" or "permissible dwell time," during which the faying surfaces of abrasive material can be adhesively assembled together and a satisfactory bond achieved, must also be observed by the operator. Although it is sometimes possible for an operator to coat other abrasive strips for belt formation during the "dwell time," thus setting up a situation where abrasive belts can be somewhat continuously formed, such a procedure is often confusing to the operator. Often-times abrasive strips adhesively-coated during the "dwell time" for other previously coated strips, for one reason or another, are improperly kept account of. This results in some adhesive compositions not receiving the "required dwell time" and others receiving too much, i.e., exceeding the "permissible dwell time." The result in either instance may be formation of an inferior belt joint.

A further disadvantage associated with the use of a liquid composition results from the fact that different operators, in preparing the coated abrasive ends for belt formation, invariably apply more or less of the adhesive composition than is required for optimum results. The adhesive composition, in some instances, to provide a layer of adhesive material sufficiently thick for provision of a bond of suitable strength, must be applied in multiple coats because application of a thicker layer by means of a more viscous composition is not possible.

Because of the nature of a liquid adhesive composition and its manner of preparation and application, the quality of a joint formed therewith often varies somewhat, even from belt-to-belt over a particular period of manufacture. This lack of uniformity in the manufacture of endless coated abrasive belts is naturally accompanied by a lack of uniformity in results in use. This, of course, results in complaints from users of the belts.

Rather than using a liquid adhesive composition in coated abrasive belt manufacture, Applicant has heretofore suggested the use of a preformed adhesive film.

Such an adhesive film of a polyurethane composition is disclosed in each of the above-mentioned patent applications from which this application depends. A further improved preformed adhesive film for coated abrasive belt manufacture of somewhat similar composition is disclosed in application Ser. No. 152,694 filed June 14, 1971, now U.S. Pat. No. 3,770,555, by Applicant herein and Matthew T. Gladstone; the patent discloses an adhesive composition which is the partially cured reaction product, in dry film form, of a component having available free isocyanate groups, a first active hydrogen containing component having a hydroxyl number of from about 2 to 15, and a second active hydrogen containing component having an active hydrogen equivalent weight of from about 27 to less than about 500. Other prior art exemplary of the use of preformed adhesive films are U.S. Pat. Nos. 2,060,906; 2,778,169; 2,794,726; 3,406,053; and 3,449,280. As disclosed in these patents, adhesive films have been suggested for use in the bonding together of various lamina. The formation of endless coated abrasive belts is disclosed in, e.g., U.S. Pat. Nos. 2,778,169 and 2,794,726.

SUMMARY OF THE INVENTION

In accordance with the general aspects of this invention, I have now discovered a still further improved adhesive composition that can be provided in the form of a partially cured, heat-activatable, preformed film. This adhesive film can be used over a relatively wide, as well as a relatively low, press joining temperature yet will provide a joint of unexpectedly high strength. Thus, an adhesive film in accordance with the invention can be used in the bonding of a wide variety of coated abrasive materials.

Adhesive films used in the practice of this invention basically comprise the partially cured reaction product of a composition comprising in admixture: (1) a first active hydrogen containing component in the form of a hydroxyl terminated polyurethane polyester having a hydroxyl number of from 2 to 15, (2) a second active hydrogen containing component containing at least difunctional active hydrogen and having an active hydrogen equivalent weight in the range from about 27 to less than about 500, (3) a component having available free isocyanate groups, and (4) a tackifier or reaction inhibitor such as a chlorinated aliphatic or aromatic hydrocarbon, or an alkylated polystyrene.

Use of an adhesive film such as disclosed herein results in the optimum amount and composition of adhesive being used in each and every joint formed. It makes it unnecessary during belt manufacture for an operator to allow for a "dwell time" during which solvent is evaporated and whereby cure may be advanced to a degree resulting in cohesive strength satisfactory for joining. Most importantly, the adhesive film is the sole bonding member. A wet adhesive need not be applied at all to a surface mating with the adhesive film in preparation for joining. Thus, this invention makes it possible to more substantially automate the manufacture of coated abrasive belts. Increased efficiency in belt manufacture, as well as a more uniform and reliable abrasive product of higher quality, is made possible by the invention.

Quite advantageously, and not to be overlooked, eliminating the necessity for a liquid adhesive composition, makes unnecessary the messy means of application associated therewith, e.g., by brushing, etc., thus resulting in better housekeeping, and less waste of adhesive composition. An adhesive film as set forth in this invention is further desirable in that in its use no obnoxious solvent is evaporated in the belt making area thus making special ventilation unnecessary, and moreover, reducing atmospheric pollution.

BRIEF DESCRIPTION OF THE DRAWING

The invention will be better understood by referring to the drawing in which like numerals refer to like parts in the various views and in which.

DETAILED DESCRIPTION OF THE INVENTION AND PREFERRED EMBODIMENTS

Figure 1:
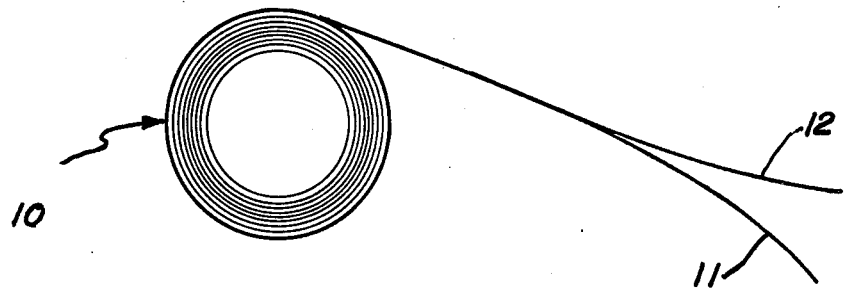
FIG. 1 is an end view of a roll of preformed adhesive film in accordance with the invention interwound with a release carrier.

Turning now to the drawing, there is disclosed in FIG. 1 thereof, in accordance with one aspect of the invention, a roll 10 of dry, heat-activatable, at least partially cured, preformed adhesive film 11 on release liner or carrier 12. Adhesive film 11 can be used as is in the joining together of various similar and dissimilar lamina; however, in a further aspect, the adhesive film, as hereinafter more fully disclosed is laminated to a reinforcing member. A preferred use in either aspect of the invention is in the formation of abrasive belts. A lap jointed belt being manufactured with the unreinforced film and a butt jointed belt being manufactured with the reinforced adhesive film.

Figure 2:
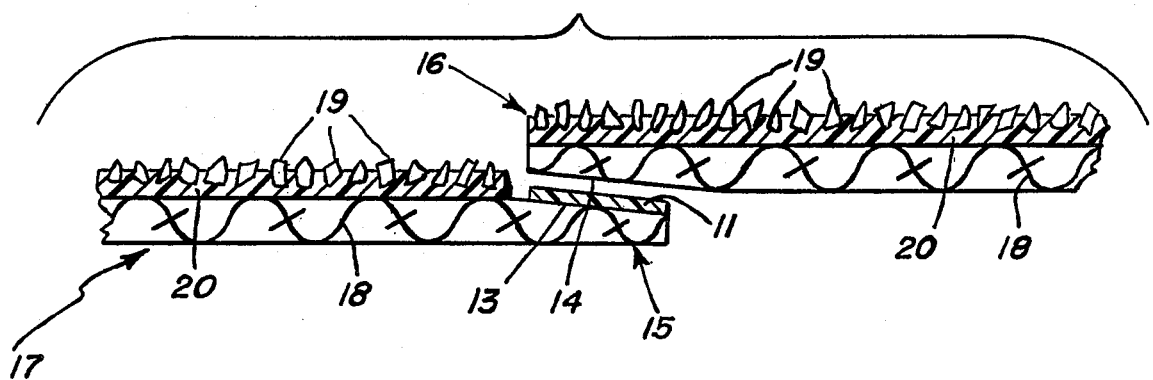
FIG. 2 is a sectional view showing two ends of abrasive material being joined together as in the formation of an endless abrasive belt having an overlap joint.

In FIG. 2, adhesive film 11 is shown being used to join together surfaces 13, 14 of the two free ends 15, 16 respectively, of a strip of abrasive material 17. Abrasive material 17, as is conventional, comprises a backing member 18 and, on the front side thereof, abrasive grains 19 adhered to the backing member by means of an adhesive bond 20.

Any coated abrasive sheet material can be used in the practice of my invention as the abrasive material forms no part of the invention per se. Backing member 18 can be of any material found suitable in the manufacture of coated abrasive sheet material. This includes paper, cloth, vulcanized fiber, and the like finished with various materials depending on the end use for the coated abrasive product. The sizing and filling materials used in the finishing operation can be, e.g., starch, glue, filled or otherwise as desired, or a resinous material such as phenol-formaldehyde. Abrasive grains 19 can be of any of those grain materials, natural or synthetic, used conventionally in the manufacture of coated abrasive sheet material. These include, for example, flint, emery, garnet, silicon carbide, aluminum oxide, and zirconia-alumina abrasive grains.

The adhesive bond 20 can be, for example, of a resinous material such as phenol-formaldehyde, epoxy resin, and the like. However, quite advantageously, this invention can also be used with an animal glue maker adhesive composition. The bonding layer, as is conventional, may include a sand size coat of the same composition as the maker adhesive layer or not, as desired. Where the sand size coat is of a heat hardened resinous material, e.g., phenol-formaldehyde, the maker adhesive coat can be of either glue or resinous material.

Abrasive strip 17, as is usual, preparatory to formation of an abrasive belt, as disclosed in FIG. 2, is cut to the desired width and length from a suitable coated abrasive sheet material. The free ends 15, 16 of the coated abrasive strip, according to conventional techniques, are preferably cut at an angle, e.g., from 30 to 75 degrees, with respect to the lengthwise direction of the strip of abrasive material. A preferred angle is 55 degrees. However, if desired, and in some applications, the cut can be made normal to the lengthwise direction.

In the practice of the invention, e.g., in the formation of an overlap joint (FIG. 2), it is preferred, as shown, that surfaces 13, 14, in accordance with usual techniques, be beveled by skiving and abrading respectively. Thus, a narrow area is delimited adjacent each free end 15, 16 of the abrasive strip 17 for application of adhesive film 11. Moreover, this preparatory treatment makes for better adhesion, and lesser joint thickness. In general, in skiving the upper portion of end 15 it is preferred to remove substantially all the adhesive layer 20. A taper, as shown, of 2-3 mils is desired from the trailing edge of the skived area to the leading edge thereof. The lower surface 14 of end 16 can be back rubbed, wire brushed, sand blasted, or the like to provide an abraded surface area matching with the skived surface 13 on end 15. Sand blasting is preferred as a backing preparation for joining as this seems to result in somewhat better joint performance. The extent of sand blasting should remove any backsize previously applied to the backing member; however, one should be careful not to degrade the cloth by cutting the fibers in the backing member yarns. Thus, a clean, somewhat roughened surface is presented for contact with the adhesive film. This results in better wetting by the adhesive composition as well as flow into the backing member.

After surface preparation, the free ends 15, 16 of strip 17 of coated abrasive material are superposed in overlapping manner, as shown, and joined together, as hereinafter more fully explained, by the preformed adhesive film 11. These ends in the drawing (FIG. 2) are shown out of contact with one another and end 16 with adhesive film 11 for sake of clarity. It will be understood by those skilled in the art that the thickness of adhesive film 11, as shown in the drawing, as well as that of coated abrasive material 17 is exaggerated to better show the invention. In a completed belt joint, surfaces 13, 14 of belt ends 15, 16, respectively, will be closely adjacent one another and secured together by means of preformed adhesive film 11. It will, of course, not be possible to discern in the completed joint that the joint adhesive was initially a preformed film.

Figure 3:
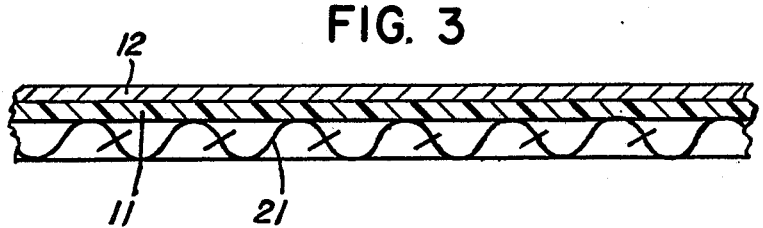
FIG. 3 is a greatly enlarged view in section showing a strip of the adhesive film-release carrier assembly of FIG. 1 laminated to a reinforcement.
Figure 4:
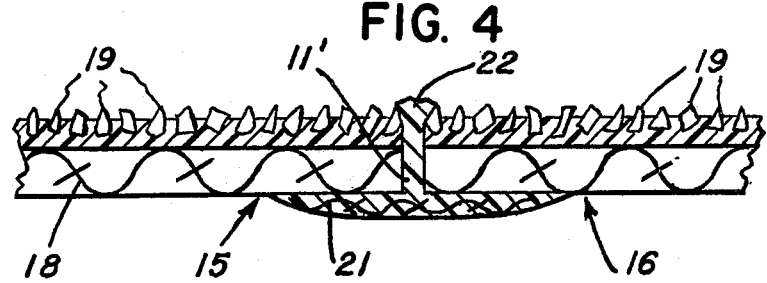
FIG. 4 is a partial sectional view showing the adhesive film-reinforcing fabric assembly in FIG. 3, with the release carrier removed, used in the formation of a butt jointed abrasive belt.

In some bonding applications, it will be preferred to provide a reinforcement in combination with adhesive film 11 such as woven fabric 21 shown in FIG. 3. An adhesive film-reinforcement combination is used to advantage, for example, in the formation of an abrasive belt by butt joining. Such an abrasive belt is shown in FIG. 4 of the drawing. Therein, abrasive ends 15, 16 are seen to be closely abutted together. The ends, although not shown by the drawing, preferably, as is conventional, and before disclosed, are cut at a suitable angle with respect to the running direction of the abrasive belt being formed. Surface preparation for butt joining, contrary to the formation of a lap joint, is limited, of course, to the back of the coated abrasive backing member. In general, backing member 18 is back rubbed or the like, as before-described, in the area immediately adjacent free ends 15, 16 so that adhesive film 11 will contact the backing member per se rather than a coating material applied to the backing member. In this way, an abraded surface is provided for adhesive contact and one that is more receptive to penetration by the adhesive during the joining operation.

One sees manifested in the drawing (FIG. 4) the advantageous flow properties of an adhesive composition as disclosed herein. Adhesive film 11 when subjected to pressure while heated flows into and fills up the joint line crevice as shown by reference numeral 22. Thus, and this is an important feature, detritus or swarf from the grinding operation is prevented from packing into the joint line. When swarf impaction occurs, belt joint failure often results from premature delamination. Adhesive film 11 also flows into and partially penetrates reinforcing patch 21. An abrupt edge between patch 21 and coated abrasive backing member 18 is reduced because adhesive flows outwardly from the lateral edges of the patch forming, as shown in the drawing, a somewhat tapered surface running from each edge of the patch to the back of the backing member.

The preformed adhesive film 11 of the invention, and used in the practice thereof, is the dried, partially cured, heat-activatable, reaction product of a polyurethane adhesive composition comprising in admixture a polyfunctional active hydrogen-containing component which consists of, in combination, a hydroxyl terminated polyurethane polyester having a hydroxyl number of from about 2 to about 15, and a member containing at least difunctional active hydrogen and having an active hydrogen equivalent weight in the range from about 27 to less than about 500, more preferably from about 67 to about 300, a component having available free isocyanate groups, and a fourth component which is a chlorinated aliphatic hydrocarbon, chlorinated aromatic hydrocarbon, an alkylated polystyrene or mixtures thereof.

Hydroxyl terminated polyurethane polyesters, as is well known, are, in general, prepared by reacting a molar excess of a hydroxyl terminated polyester with a suitable polyisocyanate. Many polyesters of this type useful for reaction with polyisocyanates are known and are available commercially. They are formed, in general, by esterifying and polymerizing a dibasic or polybasic carboxylic acid, or mixtures of these acids, with a complementary bi- or poly-functional compound containing more than one alcoholic group, or mixtures of these compounds. Suitable acids for reaction to form polyesters, which primarily should be saturated acids, include succinic, glutaric, adipic, pimelic, maleic, azelaic, sebacic, diglycolic, and dimer linoleic. Examples of polyhydric alcohols include ethylene glycol; propylene glycol; butylene glycol; diethylene glycol, 1,5-pentanediol, and hexamethylene glycol. Small proportions of a polyhydric alcohol such as glycerol, castor oil, and trimethylol propane may also be used. The reaction of these materials to form polyesters ordinarily involves a simple heating for a few hours, usually with removal of water formed during reaction by maintaining a vacuum over the reaction mixture. The acid and alcohol are combined in proportions providing a substantial excess of hydroxyl groups over acid groups and the reaction is carried to a point giving a product having hydroxy groups, preferably terminal, with a hydroxyl number from about 30 to about 140, preferably 50-60, an acid number 0-12, and a molecular weight between about 2000 and 4000.

Reaction of the polyesters with the polyisocyanates involves mixing one or more polyisocyanates with one or more polyesters and heating the mixture until the reaction is to the desired completion. The reacted material is then cooled to solidify it and broken up for convenience in handling. Arylene diisocyanates such as 2,4-toluene diisocyanate; 1,5-naphthalene diisocyanate, and m-phenylene diisocyanate are preferred because of toxicity problems with aliphatic isocyanates but aliphatic isocyanates such as hexamethylene diisocyanate or pentamethylene diisocyanate may be used along with or in place of the arylene diisocyanate if proper health and safety precautions are taken. The isocyanate and polyester are combined in relative proportions of about 0.9 to about 1.4 mols of diisocyanate per mol of polyester.

A hydroxyl terminated polyurethane polyester elastomer, as is desired in the practice of this invention, is available commercially in solvent solution from United Shoe Machinery Corporation. One such a solution is identified as Bostik 7070 in their bulletin BA20, page 4. Bostik 7076 is comparable except that a mixture of acetone-toluene is used as the solvent rather than ethyl acetate. The solvent is of no consequence and other solvents or diluents suitable as a vehicle for the polyurethane elastomer can be used. Merely by way of example, methyl ethyl ketone may be used, if desired. The polyurethane polyester in Bostik 7076 is believed to be the reaction product of toluene diisocyanate (1.13 mols) with a hydroxyl terminated polyester (1.0 mol) of adipic acid and butylene glycol, the polyester having a hydroxyl number of about 55 and an acid number of 2.

The other active hydrogen containing member or component may, in general, be any compound containing at least difunctional active hydrogen in the form of —OH, —SH, —NH—, and —NH$_2$ so long as the active hydrogen equivalent weight of the compound is in the range from about 27 to less than about 500, preferably from about 67 to about 300. When one desires a somewhat longer adhesive film shelf life, a higher equivalent weight member will be used. One of this type compound which may be used in the practice of the invention is Thylon D-406, a polyester-polyurethane isocyanate blocked prepolymer available from Thiokol Chemical Corporation. Another is Unithane 200, a polyether-polyurethane isocyanate blocked prepolymer, also available from the same manufacturer. These active hydrogen containing components are believed disclosed in U.S. Pat. Nos. 3,228,820 and 3,252,848, the disclosures of which are hereby incorporated.

Active hydrogen containing compounds which will not be found satisfactory for combination with the hydroxyl terminated polyurethane polyester include, for example, aliphatic diamines such as diethylene triamine, ethylene diamine, and triethylenetetramine. With these compounds, polymerization is so promoted that in the adhesive composition localized gelation occurs almost immediately on mixing the compound with the other components thus making it impossible to cast a film thereof. On the other hand, active hydrogen containing compounds having an active hydrogen equivalent weight above about 500, e.g., additional Bostik 7076, are so slowly reactive with the isocyanate that polymerization of the adhesive film is not adequately promoted to result in a joint of the desired initial strength, i.e., immediately on removal from the press.

The isocyanate component utilized in the practice of the invention is not critical so long as it has available sufficient free isocyanate groups to react satisfactorily with the reactive hydrogens and thus cure the adhesive composition. Any organic diisocyanate or polyisocyanate such as triisocyanates and tetraisocyanates, or mixtures of diisocyanates, polyisocyanates, or both may be used. Merely by way of example, toluene diisocyanate, p, p-diphenylmethane diisocyanate, polyphenyl polymethylene polyisocyanate, triphenyl methane triisocyanate, and the like may be used. As will be appreciated, the particular diisocyanate or polyisocyanate used must be either soluble in the solvent used for the active hydrogen components or dissolved in a solvent compatible therewith. An isocyanate material meeting these requirements and found particularly suitable in the practice of the invention is a product available commercially under the trade designation Mondur CB-75 from Mobay Chemical Company. This product, a polyurethane prepolymer in solution, is described in Urethane Coating, Second Edition, published by Mobay and is the reaction product of trimethylol propane and toluene diisocyanate.

A chlorinated aliphatic hydrocarbon which has been found quite satisfactory in the practice of the invention is Paroil 170 HV available commercially from Dover Chemical Company, Dover, Ohio. This hydrocarbon is described in their product release of September 1958, revised March 1959, and contains 70 percent combined chlorine. Incorporation of this component into the adhesive composition results in, it is believed, an abrasive belt joint of unexpectedly high resistance to flexural fatigue and improved adhesion over adhesive compositions not incorporating such a component. Another chlorinated aliphatic hydrocarbon which produces an improved adhesive for belt joints is a material sold as Unichlor 40 by the Neville Chemical Company; Unichlor 40 contains about 41.5% chlorine. Also suitable are alkylated polystyrenes such as the Piccolastics manufactured by Harwick Standard Chemical Company, and the Arochlors (chlorinated aromatics) manufactured by Monsanto Company. Of importance also is the fact that these generally improved properties can be obtained at lower joining temperatures thereby making it possible to join abrasive materials incorporating backing members susceptible to heat degradation at higher joining temperatures.

Ultimate curing of the adhesive composition used in the manufacture of the adhesive film, hereinafter more fully described, depends, of course, upon the number of free (—NCO) groups available in the adhesive composition. As this depends on the particular isocyanate component used, the amount of isocyanate component required depends, of course, on the amount of and particular combination of active hydrogen members used in the adhesive composition. In general, however, and by way of example, a joint of satisfactory initial strength, as well as one of ultimate strength, will be obtained, where the hydroxyl terminated polyurethane elastomer is Bostik 7076, with from about 4.7 to about 12.5, preferably 4.8 to about 6.8 parts, Thylon D-406, and from about 4.4 to about 15 parts Mondur CB-75 per 100 parts Bostik 7076. Where the amount of Thylon D-406 is less than as above-indicated, curing is not sufficiently promoted to give a joint of the desired strength within the time desired. Use of greater amounts of Thylon D-406 results in a film too heat resistant to permit heat activation thereof at temperatures found most suitable for belt joint formation. The amount of Paroil 170 HV in the composition can be from about 6.75% to about 41%, preferably 13.5% to 34% solids, per 100 parts solids in Bostik 7076. From this, one can determine readily from a few simple experiments in the laboratory what amounts of the various components will be found suitable for optimum results in any particular application.

Preformed adhesive film 11 may be, in general, manufactured from the adhesive composition according to any usual film forming techniques. One such a technique involves casting a suitable amount of the adhesive composition on a so-called release liner or carrier 12 to result in, depending on the amount of solvent in the composition, the film thickness desired after solvent evaporation. Any release liner can be used and several are available commercially, e.g., a polyethylene coated paper or a paper coated with a silicone resin, polytetrafluoroethylene, or the like. The adhesive composition can be, in the practice of the invention, applied to release liner 12 by various means, e.g., a knife on roll or reverse roll coating procedure, or a doctor blade. Afterwards, the wet, adhesive coated release liner 12 is heated for a sufficient period of time and at a suitable temperature for the solvent to evaporate from the adhesive composition to provide a dried, adhesive film and one that is somewhat partially cured. However, and this is extremely important, as hereinafter made clear, the adhesive film must remain heat-activatable at the joining temperatures found suitable in the manufacture of coated abrasive belts. By "heat-activatable" is meant the adhesive film will be merely softened and tackified. The extent of partial curing should, however, provide sufficient cohesive strength in the adhesive film that it will not unduly flow, i.e., be squeezed out from and result in a starved joint, on application of heat and pressure during the joining cycle. In general, where higher joining temperatures are allowable, an adhesive film having a greater degree of partial cure can be used. The higher the degree of partial cure, and this is indicated by film plasticity, the greater the temperature needed to activate the film.

To provide adequate bond strength when used in a coated abrasive belt joint, the adhesive film should be at least about 1.5 mils thick up to about 4 mils thickness. This feature, however, is somewhat determined by the materials being joined. Generally, in coated abrasive material for stock removal applications, as contrasted to polishing, a thicker adhesive film is used. A much thinner film, e.g., 1 mil or less results in poor bond strength. A thicker film in the case of lap joints makes far too thick a joint thus resulting in bumping and chattering of an abrasive belt during use.

The layer of adhesive composition obviously may be dried by any well known means. Satisfactory drying may be readily accomplished in a conventional hot air oven of which various types are available commercially. Ovens which provide a flow of air counter-current to the direction of travel of the wet film are preferred for continuous manufacture of the film adhesive. The temperature and time relationship required for heating will, of course, depend on a number of factors including the particular components in the adhesive composition. This relationship should provide, however, as before-mentioned, for substantially complete solvent removal as well as for reaction of the components in and some partial curing of the adhesive film composition. Heat activation must necessarily be accomplished at a temperature below which the materials being joined are likely to be damaged. With partial curing such as desired in the practice of this invention, the preferred adhesive film will, on application of heat and pressure, flow into intimate contact with the surfaces to be joined yet not be squeezed out from therebetween so as to result in a starved joint. Quite advantageously, partial cures have been found satisfactory which result in an adhesive film which can be heat activated at temperatures ranging from about 175° F. to about 375° F. Above this temperature, damage can result to a coated abrasive backing member.

A desirable partial cure can be obtained in general in heating a film, which initially may be from about 20 to about 30 percent solids, the solids comprising (by weight) from about 56 to about 70 percent hydroxyl terminated polyurethane, from about 9.7 to about 12 percent active hydrogen member, from about 10.5 to about 13.5 percent isocyanate, and from about 4.8 to about 23 percent chlorinated aliphatic hydrocarbon (or one of the other comparable types of material named above) after solvent removal, for from about 10 to about 60 minutes at from about 300° F. to about 250° F. The adhesive film should not, however, be cured to such an extent, if it is to be used in joining abrasive material, that it is not flowable or cannot be tackified with conditions of pressure and heat found desirable in the manufacture of coated adrasive belt joints.

The adhesive film-carrier combination, after partial curing, can then be wound into rolls, and slit, if desired, into rolls of lesser widths. The adhesive film composition continues curing (moisture from atmosphere, backing member, etc.) even at room temperature. However, the rate of curing is relatively slow and can be retarded even further by storing the rolls of adhesive film in sealed plastic bags, e.g., of polyethylene, at relatively low humidity and temperature. A desiccant such as "Drierite" (anhydrous calcium sulfate) is advantageously included in each bag. Provided the adhesive film is stored in a dry atmosphere, e.g., about 0–5% relative humidity (R.H.) at 5° F. or less, the adhesive films can be used and satisfactory bonds achieved in belt joints even after a storage life of several months. Once the adhesive film is removed from these controlled conditions of low temperatures and humidity, however, it must be used generally in a matter of hours depending on atmospheric conditions. Thus, an adhesive film in accordance with the invention has a pot or shelf life outside the controlled environment of only about 8–10 hours at 85° F., 65% relative humidity (R.H.); however, a film of the same composition has a pot life of about 36 hours at 75° F., 25% R.H. Quite advantageously, however, inclusion of the aromatic or aliphatic hydrocarbon, or alkylated polystyrene, in the adhesive composition results in improved shelf life over that of an adhesive composition not including one of these materials. In the practice of the invention, when adhesive film 11 is to be used relatively immediately, it need not, of course, be packaged. Otherwise, however, it is manufactured ahead and desirably packaged and stored as above-disclosed. As, and when, required for the manufacture of abrasive belt joints or otherwise, packages of the adhesive film, for relatively immediate use, can be removed from the controlled environment.

When an abrasive belt as disclosed in FIG. 2 of the drawing is to be manufactured, a suitable width and length of abrasive material is provided and the ends 15, 16 of the abrasive strip are prepared for belt formation, as before disclosed, according to usual techniques. An appropriate length of adhesive film-carrier combination 11, 12 is unwound from a roll 10 thereof, is applied to the skived surface 13 of the coated abrasive strip 17 which previously has been positioned as usual on the bottom bar of a platen press and, is then cut off. The length of adhesive film-carrier can be cut from the roll before application, if desired. Any press can be used in the practice of the invention provided both the upper and lower bars or platens are capable of being heated to the extent desired and the press is capable of exerting a suitable pressure on the layers being joined.

Coated abrasive strip 17 with the partially cured, heat-activatable adhesive film 11 — release liner 12 thereon (adhesive film against skived surface) is then subjected to light pressure, e.g., about 388 lbs./in.$^2$ while being heated by the bottom bar only (e.g., about 240° F.) for about 3 seconds. Thus, the adhesive film is heat activated, i.e., softened and tackified, in preparation to forming the belt joint. The pressure is then released, the upper bar retracted, and the release liner 20 removed from the activated adhesive film. End 16 of coated abrasive strip 17 is then overlapped as shown in FIG. 2 with end 15 and the overlapped ends are then again subjected to heat and pressure as above-mentioned to initiate the joining operation. Joining is then completed by subjecting the superposed, overlapped coated abrasive ends to pressure while simultaneously heating from both sides. The pressure used in this portion of the joining cycle can be varied as desired, e.g., from about 1000 lbs./in.$^2$ to about 12000 lbs./in.$^2$. In general, the time and temperature required to effect optimum initial joint strength whereby to obtain suitable handling strength of the abrasive belt for any particular adhesive composition will, of course, vary with each particular adhesive composition. Satisfactory joints have been made, for example, by using joining temperatures within the range from about 175° F. to about 375° F., a preferred temperature range being about 240° F. to about 335° F. for from about 5 seconds to about 30 seconds, while pressing at from about 4300 lbs./in.$^2$ to about 8600 lbs./in.$^2$.

In a further aspect of the invention, adhesive film 11 can be provided in combination with a woven fabric 21 as shown in FIG. 3 of the drawing. This is accomplished, in general, by laminating a strip of some suitable fabric, to an adhesive film as disclosed in this application. A highly preferred fabric is one of Nomex aromatic polyamide, disclosed in my copending patent application Ser. No. 233,572, the entire disclosure of which is herein incorporated by reference.

Preferably, the woven fabric is pre-impregnated with some suitable adhesive composition and this adhesive composition is then dried or cured to an essentially tack-free condition prior to laminating with the heat-activatable adhesive film. The adhesive composition used for pre-impregnation can be of the same or different composition as the adhesive film. However, a highly desirable combination with the polyurethane adhesive film of this invention is a nylon polyamide-epoxy saturant.

The adhesive film-release carrier combination can be laminated continuously or not, as desired, to the woven fabric strip and afterwards wound into rolls of suitable length. In this form, the adhesive film-reinforcing fabric assembly can be used immediately or packaged and stored as described previously for future use.

In manufacturing an abrasive belt joint as disclosed in FIG. 4, the backside of free ends 15, 16 are back rubbed or otherwise prepared as before described. The coated abrasive ends are abutted together, and the reinforcing patch-adhesive film assembly of FIG. 3 is positioned so as to bridge the abutted ends as shown in the drawing. The adhesive film, of course, directly contacts the backing member. Heat and pressure, depending on the abrasive material being joined, is usually then applied to the joint assembly — preferably in steps, e.g., a 15 second press at a low pressure, e.g., 194 psi, at 335° F., preferably 240° F.–275° F. (bottom bar only) followed by at least one, sometimes two additional pressings, e.g., for from 20 secs., using a heated bar top and bottom. In the second pressing stage, the top bar and bottom bar are both heated to 240° F.–335° F. The pressure setting in these two final presses may be as high as 2 tons per inch of belt width. Even higher pressures, e.g., 3 tons or more, may be used, in some instances, if a thinner joint is desired. Although heat is generally used in the joining operation, a joint can be made satisfactorily without heat at very high pressure provided the adhesive layer has had a relatively low "dwell time." As a result of the application of heat and pressure, the adhesive intimately bonds the special reinforcing patch to both ends of the coated abrasive material. Thus, the reinforcing patch and adhesive, in combination, provides a joint which offers advantageous resistance to failure because of forces and temperatures on the coated abrasive material in the grinding operation.

The reinforcing patch must be sufficiently porous and so positioned in the completed joint that the adhesive will at least partially penetrate the weave (warp and fill yarns form interstices) of the patch to develop satisfactory adhesion. It may be found desirable, at least in some instances, to provide an adhesive layer which is noncoextensive with respect to, i.e., is wider than, the reinforcing patch. Thus, in use, the backing member of the coated abrasive material will be better protected against grinding fluids in the joint area and more likely to resist flexural and other forces in use which have heretofore sometimes lead to premature failure.

The following examples, which are given for purposes of illustration only and are not intended to be limiting of the inventive concept, will more clearly illustrate the preferred embodiments of the invention.

EXAMPLE 1

An adhesive composition was prepared by mixing together the following components.

| COMPONENT | PARTS BY WEIGHT |
|---|---|
| BOSTIK 7076 (21% solids in acetone-toluene solvent) | 88.8 |
| MONDUR CB-75 (75% solids in ethyl acetate) | 4.5 |
| THYLON D-406 (70% solids in methyl-ethyl ketone) | 4.3 |
| PAROIL 170 HV | 2.4* |

*10% by weight based on total solids not including Paroil 170 HV.

Mixing was conducted at room temperature, Mondur CB-75, Thylon D-406, and Paroil 170 HV being added to Bostik 7076 sequentially, a few minutes mixing occurring between each addition. Mixing was continued for about an hour after adding the chlorinated aliphatic hydrocarbon to provide a homogeneous mixture.

The above composition was coated onto a conventional silicone coated release carrier using a doctor blade with a 30 mil gap setting. The wet adhesive layer was allowed to air dry for 30 minutes at room temperature, i.e., 70° F. 50% Relative Humidity (R.H.). Afterwards, the adhesive coated carrier was heated at 225° F. for 40 minutes to form a partially cured heat-activatable adhesive film 3.0-3.5 mils thick. The film is observed to have a slight degree of finger tack and is, of course, extremely tacky with respect to itself.

Prior to application of the coating to the release carrier, the adhesive composition was allowed to stand over night so that entrapped air bubbles from mixing could escape. This is found to provide a smoother coat than when an adhesive composition is coated immediately after mixing. However, the results in physical characteristics in abrasive belt joints are essentially the same whether or not the adhesive composition is allowed to stand over night.

The abhesive film-release carrier combination above-manufactured was slit into a plurality of strips 13/16 inches wide and wound into rolls of suitable length for use in the manufacture of abrasive belts as hereinafter described.

A strip (6 in. × 24 in.) of 120 × RESINALL® METALITE® abrasive cloth was prepared for formation of an endless abrasive belt. The abrasive surface of one free end of the abrasive strip was skived according to usual techniques thereby removing the abrasive material and the adhesive bond, leaving the upper portion of the backing member exposed. The skived surface (⅞" × 7.5") was at an angle of 55 degrees with respect to the lengthwise direction of the abrasive strip and was slightly tapered, from trailing edge to leading edge thereof, at an angle of about 5 degrees with respect to the horizontal. The mating surface of the other end of the abrasive strip was back rubbed with an abrasive belt, leaving the surface very slightly tapered and free of previously applied backsize.

A suitable length of the adhesive film-carrier combination was withdrawn from a roll thereof and was cut at a length and of a shape complementary to the skived surface area. The dried, partially cured, heat-activatable adhesive film was then positioned directly on the skived surface (See FIG. 2), the strip of abrasive material having been positioned previously on the bottom bar of a conventional platen-press.

The upper bar (platen) of the press was then brought into contact with the release liner, a pressure of about 386 psi being exerted on the adhesive film-carrier combination and skived abrasive end. This pressure was held for a period of about 3 seconds while the film-abrasive material was being heated solely by the bottom bar having a surface temperature of about 240° F. Thus, the adhesive film was softened and tackified in preparation for the subsequent joining operation.

Next, the pressure was released and the upper bar was withdrawn from contact with the release liner. The release liner was then removed from the heat activated, i.e., softened and tackified adhesive film. The bottom surface of the other end of the coated abrasive strip was then positioned in contact with the upper surface of the activated adhesive film.

The overlapped coated abrasive strip-adhesive film assembly was then again pressed while being heated only by the lower bar. A pressure of 386 lbs./in.² was maintained for 3 seconds (bar temperature 240° F.) after which it was released and the upper bar was slightly withdrawn. The coated abrasive strip-film adhesive assembly was then removed from this press and was positioned in a similar press. The upper bar therein was brought into contact with the overlapped portions of the coated abrasive strip. A pressure of 8600 lbs./in.², was maintained while the assembly was heated by both bars for about 20 seconds (bar temperature 240° F.). The pressure was then released and the thus produced abrasive belt was removed from the press. On visual examination, the abrasive belt was observed to have a joint thickness not substantially greater than the thickness of the coated abrasive material per se.

On subjecting belt joints thus manufactured and conditioned for at least 24 hours at 70° F., 50% R.H. to severe and continuous flexing in the immediate area of the belt joint on a multi-head oscillating flex fatigue tester, belt joints according to the invention were found to have the flexes, as below indicated, before failure occurred. A control differing only in that the adhesive film used did not contain chlorinated aliphatic hydrocarbons was evaluated after the same conditioning period. In this test, a strip of coated abrasive material (½" × 18") including the joint is held under tension (32-34 lbs./in. width) and the abrasive material is moved back and forth at 200 cycles per minute in a 90° change in direction over a ¼" diameter roll. This test is particularly directed at producing delamination failure in an abrasive joint.

| EXAMPLE | TEST DATA | FLEXES TO FAILURE | % JOINT LIFE |
|---|---|---|---|
| 1A | INVENTION | 3220 | 250 |
|    | CONTROL   | 1300 | 100 |
| 1B | INVENTION | 4460 | 560 |
|    | CONTROL   | 800  | 100 |
| 1C | INVENTION | 3620 | 370 |
|    | CONTROL   | 980  | 100 |
| 1D | INVENTION | 4160 | 290 |
|    | CONTROL   | 1420 | 100 |
| 1E | INVENTION | 11160 | 630 |
|    | CONTROL   | 1760 | 100 |
| 1F | INVENTION | 5060 | 165 |
|    | CONTROL   | 3060 | 100 |
| 1G | INVENTION | 1500 | 92 |
|    | INVENTION | 2300 | 140 |
|    | CONTROL   | 1640 | 100 |

The above results in flex fatigue resistance using an adhesive film of the invention are believed quite surprising when compared to those obtained with an adhesive film composition omitting the Paroil 170 HV. Disregarding the extreme results at each end, an improvement of at least 140% is indicated:

EXAMPLES 2-7

Adhesive compositions were prepared, as before described, by mixing the following components together in the amounts indicated:

| COMPONENT | PARTS BY WEIGHT EXAMPLE | | | | | |
|---|---|---|---|---|---|---|
|  | 2 | 3 | 4 | 5 | 6 | 7 |
| BOSTIK 7076 (21% solids in acetone-toluene solvent) | 91.0 | 89.9 | 88.8 | 87.8 | 86.7 | 84.5 |
| MONDUR CB-75 (75% solids in ethyl acetate) | 4.6 | 4.53 | 4.5 | 4.4 | 4.4 | 4.25 |
| THYLON D-406 | 4.4 | 4.35 | 4.3 | 4.2 | 4.2 | 4.10 |
| PAROIL 170 HV | 0 | 1.22 | 2.4 | 3.6 | 4.7 | 6.88 |
| & By Weight Paroil Based on Total | 0 | 5.0 | 10.0 | 15.0 | 20.0 | 30.0 |

| COMPONENT | PARTS BY WEIGHT EXAMPLE | | | | | |
|---|---|---|---|---|---|---|
| | 2 | 3 | 4 | 5 | 6 | 7 |
| Solids Except Paroil | | | | | | |

After formulation, each composition was allowed to stand over night so that entrapped air bubbles could escape. These compositions of varying Paroil 170 HV amounts were each then coated onto release carriers and partially cured as before described in Example 1. A control was prepared having no Paroil 170 HV added to the adhesive composition. The adhesive film-release carrier combinations were each then slit into strips 13/16 inches wide and wound into rolls.

The strips of adhesive film-release carrier combination were laminated to ¾ inch wide strips of bias cut (55°) woven Nomex aromatic polyamide fabric, below described, by pressing the lamina together in superposed relationship for 3 seconds at 240° F. The adhesive film was in contact with the fabric strip and was so positioned as to extend laterally an equal distance on each side thereof. These assemblies were then used in the manufacture of abrasive belt joints, as hereafter disclosed.

The reinforcing fabric, which is available from Stern and Stern Textiles, Inc., under the trade designation HT3 and weighs 3.62 ozs./sq. yd. (6.5 mils thick), was saturated, prior to laminating with the adhesive film, with a nylon-epoxy adhesive composition as follows:

| COMPONENT | PARTS BY WEIGHT |
|---|---|
| ELVAMIDE 8061* | 12.2 |
| EPON 828** | 4.1 |
| METHANOL | 68.6 |
| 1,1,1-TRICHLOROETHANE | 14.6 |
| TRIETHYLENE TETRAMINE | 0.5 |

*Elvamide 8061 is available commercially from E.I. Du Pont de Nemours and Co. and is their trade name for an ethyl alcohol/water mixture soluble nylon polyamide formed from the reaction of hexamethylene-diammonium adipate and hexamethylene-diammonium sebacate with caprolactam.
**Epon 828 is the trade name for an epoxy resin resulting from the condensation of epichlorohydrin with bisphenol-A having an epoxide equivalent of 185-192 and is available from Shell Chemical Co.

After saturation, the impregnated fabric was heated for 4 hours at 250° F. to cure the saturant (10% by weight dry pickup) and to provide a dry, tackfree, saturated woven fabric reinforcement for the adhesive film.

Two free ends of abrasive material (120 × RESINALL® METALITE® cloth) which had been cut to matching 55° angles with respect to the longitudinal direction were abutted together, and on a suitably cut portion of the above manufactured adhesive film, on the bottom platen of a conventional platen press in usual fashion for the formation of a butt joint. Each of the free ends had been prepared by sand blasting, according to usual techniques to remove any backsize material from the bonding area.

The adhesive film-woven fabric combination (carrier removed) was assembled with the butted coated abrasive ends in such a fashion that the warp yarns of the woven fabric strip extended approximately parallel to the edges of the coated abrasive material. This assembly (adhesive film against backsize coated abrasive material) was then subjected to a 15 second press (bottom platen only heated — 335° F.) at 194 lbs./in.$^2$ followed by a 20 second press at 4300 lbs./in.$^2$, both platens heated to 335° F.

On examining the abrasive material after the joining operation, the adhesive film was observed to have flowed into the joint line crevice. This is shown as 22 in FIG. 4. Adhesive flow was found to be greater with increasing amounts of Paroil 170 HV; however, the reinforcing patch surface seemed to be blistered when the amount Paroil 170 HV was 20% by weight.

The joints thus formed, i.e., abrasive material incorporating such a joint, were then conditioned (4 days, 70° F., 50% R.H.) and then evaluated for flex fatigue resistance on an oscillating belt joint tester. In this test a ⅛ inch wide specimen, 16 inches long including the joint, is held under tension (22 lbs.) and moved back and forth at 200 cycles per minute in a 90° change in direction over a ¼" diameter roller. The results are indicated below.

| RESISTANCE TO FLEX FATIGUE | | | | | | |
|---|---|---|---|---|---|---|
| PROPERTY and AMOUNT CHLORINATED HYDROCARBON | EXAMPLE | | | | | |
| | 2 | 3 | 4 | 5 | 6 | 7 |
| % PAROIL 170 HV | 0 | 5.0 | 10.0 | 15.0 | 20.0 | 30.0 |
| JOINT LIFE PERCENT | 100 | 294 | 450 | 350 | 520 | * |
| FLEXES TO FAILURE | 1740 | 5120 | 7860 | 6040 | 9040 | |

*not tested - excessive blisters in joint area

This test, as before-mentioned, is directed at producing delamination failure in the adhesive joint. As indicated, by the improved resistance to flex fatigue, the addition of Paroil 170 HV to the adhesive composition results in a joint much more resistant to delamination than one without this additive.

It is believed significant that in the practice of this invention an improved joint results over use of an adhesive film composition omitting Paroil 170 HV; however, the greatest significance resides in the fact that improved results are obtained without prior application of liquid adhesive of the same composition, as conventionally done heretofore, to the prepared joining surface. Thus, the use of an adhesive film in accordance with this invention results in a more simplified manner to joint formation making for lesser manufacturing costs, a cleaner manufacturing area, and, most importantly, joints of more consistently uniform properties.

EXAMPLES 8-14

Adhesive compositions were prepared as in Examples 2-7 except that a 25% Paroil 170 HV composition was prepared rather than a 30% composition. Additionally, for comparison a second 10% Paroil 170 HV adhesive composition was prepared differing in that, after coating, it was allowed to air dry for only 4 minutes at room temperature, after which the dried adhesive layer was heated for 13 minutes at 100° F. and 40 minutes at 225° F.

The adhesive films, after being slit, were laminated to a saturated woven aromatic polyamide fabric strip, as before-described, after which belt joints were manufactured from similar abrasive material but having a different front size composition applied to the backing member. The backsize was the same as before in Examples 2-7. Joining temperatures of 240° F. and 335° F. were used for purposes of comparison. A lower joining temperature, e.g., 240° F. allows the adhesive film to be used with a wider range, i.e., different, abrasive material. The results from the flex fatigue testing are given below:

| Ex. | 8 | 9 | 10 | 11 | 12 | 13 | 14 |
|---|---|---|---|---|---|---|---|
| % Paroil 170 HV | 0 | 5 | 10 | 10(2) | 15 | 20 | 25 |
| Flexes to Failure 240°/335° F | 40/20 | 6680/1600 | 8460/4500 | 7440/8780 | 15800/9600 | 13880* | 14620* |

*Test conducted only on joints formed at 240° F; adhesive in joints formed at 335° F was blistered.

In comparing the above test data, one should keep in mind that Example 8 results (control) indicates, as compared, for example, to Example 2 results, the inconsistency in flex fatigue in not using a wet adhesive in combination with an adhesive film as done heretofore with a film adhesive. Nevertheless, the results obtained with the adhesive film of this invention are unexpectedly so much better that a wet adhesive application to the prepared surface to be bonded is believed unnecessary.

One can readily see from this data that, in general, at higher percentages of Paroil 170 HV a lower joining temperature results in improved resistance to flexural fatigue. Example 11 seems to indicate that this particular adhesive film may have been cured to a higher degree than the one in Example 10. This being the case, a higher temperature would be required for tackifying the adhesive film. Thus, better results would be indicated, as is the case, at 335° F. joining temperature.

EXAMPLE 15

An adhesive film assembly such as set forth in Example 10 was used in making joints in two different abrasive materials. Joining was conducted as disclosed in Examples 2-7. The joints were conditioned (7 days) and tested in the flex fatigue tests as described in Examples 2-7.

| SPECIMEN | NUMBER FLEXES TO FAILURE ABRASIVE MATERIAL | |
|---|---|---|
| | 80X RESINALL® METALITE® | 150X RESINALL® METALITE® |
| FILM WITH PAROIL 170 HV | 11140 | 21800 |
| CONTROL (w/o PAROIL) | 1880 | 3340 |

As these data indicate, the abrasive material may influence, to some degree, the results obtained in flex fatigue resistance. The 80× abrasive material has a resinous front size and the 150× material has a glue front size. The backsize in both abrasive materials is glue. The finer grit abrasive material is, of course, generally more flexible than material with larger grits. Importantly, however, these data indicate the significant improvements in flex fatigue resistance realized in using an adhesive in accordance with the invention.

As would be expected from the previous disclosure, the adhesive composition of this invention continues curing long after joint formation. The extent of curing at any particular point in time depends largely upon storage conditions, i.e., temperature and humidity. Obviously the results in flex fatigue and other physical properties will differ somewhat depending on the length of conditioning period. Thus, abrasive material (80×) as above when conditioned only 24 hours and tested has the following resistance to flex fatigue:

| ADHESIVE FILM % PAROIL 170 HV | FLEXES TO FAILURE |
|---|---|
| 0 | 3760 |
| 10 | 7020 |

Quite unexpectedly, however, these data indicate, when compared to the above data, that adhesive films with Paroil 170 HV improve with longer conditioning periods, however, omitting this component, the adhesive film degrades. What occurs here is not exactly known but the result is decreased flex fatigue resistance.

EXAMPLE 16

In this example, the effects of exposing an adhesive film (10% Paroil 170 HV) to relatively high humidity condition is shown by evaluating belt joints formed using adhesive films which had been exposed for different time periods. A Tenney Humidity Temperature Cabinet was used to simulate high humidity conditions (65% R.H. − 85° F.), the adhesive strips being conditioned for varying intervals of time in hours until the film could not be activated for bonding coated abrasive material. A control containing 0% Paroil 170 HV was used.

Abrasive belt joints (80× RESINALL® METALITE® abrasive material) were formed and evalulated as disclosed previously. The useful life of an adhesive film in hours is tabulated below — based upon joint performance on the flex fatigue tester.

| | LAP | BELT JOINT | |
|---|---|---|---|
| ADHESIVE FILM | (240° F) | BUTT | |
| | | 240° | 335° |
| CONTROL | >1, <2 | >1, <2 | 3-4 |
| INVENTION | 4 | 4-5 | >8, <16 |

The above results indicate that when exposed to high humidity conditions, an adhesive film in accordance with the invention has a much longer shelf or pot life than the control. As a standard in this test 1500 flexes and above to failure was considered a satisfactory joint.

Another way to look at this data is that with an adhesive film in accordance with the invention, an adhesive film can be exposed to high humidity conditions for a much longer period of time before higher activating (joining) temperatures are needed to provide a satisfactory joint.

The importance of this characteristic is, of course, that one need be less concerned with humidity-temperature conditions in the belt joining area from season-to-season. Thus, the adhesive film remains over the year usable with a greater variety of abrasive material, particularly those where high temperatures might be detrimental to the backing member.

EXAMPLE 17

An adhesive film-reinforcing fabric assembly (10% Paroil 170 HV), similar to that before described, was stored at 0° F. in a sealed polyethylene bag containing Drierite for 8 months. The assembly differed in that a reinforcing fabric having Nomex aromatic polyamide yarns in the fill and high tenacity nylon polyamide yarns in the warp direction was used. This fabric is available under the trade designation A5424 from Stern and Stern Textiles, Inc. The strip was cut on a 35° bias for lamination to the adhesive film.

Abrasive belt butt joints (Z40X NORZON ™ CLOSEKOTE ® abrasive cloth) were prepared, as before described except that pre-joining was at 275° F. (bottom bar only) for 20 seconds at 194 psi. This was followed by a 20 second press (4300 psi) at 240° F. (both bars). The adhesive film was so positioned that the fill yarns in the reinforcing patch were parallel to the running direction of the belt. In one case the back preparation treatment involved a wire brush abrading of the surface to which adhesive was to be applied, the other involved sandblasting.

After conditioning, these joints were then evaluated for flex fatigue resistance. Although the performance of both joints was acceptable, the joint involving wire brush roughening failed after 8040 flexes. The other joint involving the sandblast preparation withstood 22340 flexes before failure. One can readily see from these data the importance of backing preparation.

The data further indicate, it is believed, that adhesive films, in accordance with the invention, under the proper storage conditions, have a shelf life of several months. Thus, these adhesive films can be manufactured ahead and stored until needed in some future joining operation.

EXAMPLE 18

Butt jointed (55°) abrasive belts (½" × 24") were manufactured, as before disclosed, at two different joining temperatures, using 120 × RESINALL ® METALITE ® abrasive cloth as in Examples 2–7. An adhesive film containing 10% Paroil 170 HV was compared against a control of 0%.

After conditioning, the abrasive belts were tested on a single head belt rotating tester that simulates use conditions for an abrasive belt. In this test, a ⅞ inch contact roller is used and the belt is driven at 3200 surface feet per minute (SFPM) while maintained at 60 lbs./in. belt width tension (28 psi). The results are given below:

| SPECIMEN | JOINT LIFE % | |
|---|---|---|
|  | 240° F. | 335° F. |
| CONTROL | * | 100 |
| 10% PAROIL 170 HV | 970 | 1370 |

*Control joint was not made at this joining temperature as previous results were unsatisfactory.

From these data, one can readily see that a much improved joint results from using an adhesive film in accordance with this invention. A major improvement is indicated with the invention using a much lower joining temperature.

EXAMPLE 19

In this example, the effect of the degree of partial cure of the adhesive film is shown.

Adhesive films (10% Paroil 170 HV) were prepared, allowed to air dry 30 minutes, and then heated at 250° F. for different periods of time. This, of course, results in each film reaching different degrees of partial cure, i.e., polymerization. The plasticity of each film was then determined in accordance with ASTM D-926 and British Standard 1673 (Part 3) using a Williams Parallel Plate Plastimeter.

These various adhesive films were used in butt joining abrasive material (60× RESINALL ® METALITE ®) of the type used in Examples 8–14 except that the joining temperature in this example was 275° F. Joint performance was measured, as before, by resistance to flex fatigue. The results are indicated below.

| PLASTICITY NUMBER | NO. FLEXES TO FAILURE |
|---|---|
| 207.5 | 10,360 |
| 247.8 | 11,860 |
| 299.8 | 6,580 |
| 347.5 | 10,980 |
| 371.8 | 8,920 |
| 409.2 | 5,520 |
| 455.8 | 6,140 |
| 480.5 | 9,660 |
| 590.5 | 4,640 |
| 642.2 | 1,660 |
| 703.2 | 340 |

Joint performance, as these data indicate, decreases with increasing plasticity. Thus, at a joining temperature of 275° F. the most desired plasticity range is from about 280–380. Below this, the adhesive film has been found to, in general, be too soft. At higher plasticities, the adhesive is not soft enough. One will realize, of course, that at higher plasticities suitable results may be obtained at higher joining temperatures. The critical factor here is that the joining temperature must be selected so as to cause no damage to the coated abrasive backing member. Similarly, with lower plasticity films, lower joining temperatures may be found satisfactory.

EXAMPLE 20

Strips of different coated abrasive material were butt jointed as described in Example 4 to show that an adhesive film in accordance with the invention can be used to advantage in joining various coated abrasive material. A control adhesive composition containing no Paroil 170 HV (Example 2) was used for purposes of comparison. The results are shown below.

| Adhesive Film | PERCENT JOINT LIFE ABRASIVE MATERIAL | | |
|---|---|---|---|
|  | 80X Resinall ® Metalite ® | 150X Resinall ® Metalite ® | 240X Speed Wet ® Durite ® |
| 10% Paroil 170 HV | 593 | 650 | 513* |
| Control | 100 | 100 | 100* |

*Joints were soaked 30 minutes in Codol 100 (1 part) water (80 p.b.w.) mixture prior to testing and kept wet while testing. Flex fatigue testing was conducted at 16 lbs./in. tension (27 psig), ¼" diameter roller, 200 cycles per minute. Codol is a sulfated water soluble oil available from Stuart Oil Company Of Chicago, Illinois.

EXAMPLE 21

An abrasive material (150× SPEED WET ® DURITE ®) such as disclosed in Example 20 used in wet grinding applications but of coarser abrasive grain was butt jointed as disclosed in, and using an adhesive film as in, Examples 10 and 11. The evaluation of flex fatigue was as disclosed in Example 20. The results are given below.

| ADHESIVE FILM TYPE | FLEXES TO FAILURE | |
|---|---|---|
|  | 240° F. | 335° F. |
| EXAMPLE 10 | 17220 | 40720 |
| EXAMPLE 11 | 17040 | 22520 |

Waterproof abrasive products have, in general, required higher joining temperatures for optimum results than other abrasive material.

In a similar fashion adhesive films having different amounts of Paroil 170 HV therein, as in Examples 12-14, were evaluated.

| ADHESIVE FILM (% PAROIL) | FLEXES TO FAILURE |
|---|---|
| 15 | 1100 |
| 20 | 6080 |
| 25 | 26380 |

All of the joints in these latter tests were formed at 240° F. One can see from these data that as the amount of Paroil 170 HV additive is increased a more satisfactory joint results. With higher amounts of Paroil 170 HV, lower joining temperatures can be utilized and satisfactory results still be obtained.

EXAMPLES 22-31

Additional dry film adhesive compositions were prepared as described in Example 1, utilizing the following components in the quantities indicated:

| COMPONENT | ADHESIVE - WT. IN GRAMS | | | | |
|---|---|---|---|---|---|
| | A | B | C | D | E |
| BOSTIK 7069 | 300 | 300 | 300 | 300 | 300 |
| MONDUR CB-75 | 17.85 | 17.85 | 17.85 | 17.85 | 17.85 |
| THYLON D-406 | 17.49 | 17.49 | 17.49 | 17.49 | 17.49 |
| PAROIL 170 HV | 9.75 | | | | |
| UNICHLOR 40 | | 9.75 | | | |
| AROCHLOR 5460 | | | 4.88 | | |
| AROCHLOR 1268 | | | | 9.75 | |
| PICCOLASTIC A5 | | | | | 4.88 |

The resulting strips of adhesive film-release carrier combination were used to form lap jointed continuous abrasive belts as described in Example 1, and butted-reinforced jointed continuous abrasive belts as described in Examples 2-7. The belts were tested in the manner set out in Example 1 except that the flexing test was terminated when the number of flexes had reached 3000 with no belt failure. The other distinction, as compared to Examples 1-7, was that 60× RESINALL® METALITE® was used as the abrasive material instead of the 120 × RESINALL® METALITE® cloth of Example 1-7, the significance being that the coarser 60 grit material tends to be less flexible than the 120 material and hence generally will not survive as many flexes as the latter. The flexing test results were as follows:

| EXAMPLE | ADHESIVE | JOINT TYPE | FLEXES TO FAILURE |
|---|---|---|---|
| 22 | A | lap | 1140 |
| 23 | B | " | 700 |
| 24 | C | " | 400 |
| 25 | D | " | 400 |
| 26 | E | " | 1020 |
| 27 | A | reinforced-butt | 3000* |
| 28 | B | " | 3000* |
| 29 | C | " | 3000* |
| 30 | D | " | 3000* |
| 31 | E | " | 3000* |

*test stopped after 3000 flexes, with no evidence of joint failure

From the foregoing data it can be seen that when the fourth component is Paroil 170 HV or Piccolastic A5 the most durable lap joints result, with the two Arochlors and the Unichlor producing good lap joints but joints substantially inferior to joints involving the former two materials. When the joints are reinforced-butt joints, all five materials produce extremely high durability joints.

The fourth component of the adhesive composition of the present invention i.e. component (d) is preferably a liquid which is miscible in the mixture of the other three components. However, the fourth component may be a solid but it too must be miscible in the other components of the adhesive system, and must remain so when essentially all the solvents have been removed from the four component mixture. If the four component is a solid which precipitates out of the mixture when the solvents are removed, then it cannot perform its function and behaves as an organic filler. An example of a material that was inoperable was Chlorez 70, a solid chlorinated aliphatic hydrocarbon sold by the Dover Chemical Company. This material was miscible in the other 3 components of the adhesive system, in the initial mixing because of the presence of the three solvents toluene, ethyl acetate, and methylethyl ketone. However, when the 4 component adhesive mixture was deposited on the release backing and partially cured, the solvents were evaporated and, it was believed, the Chlorez 70 precipitated out of the mixture. By contrast, two solid materials that produced excellent belt joints were Neoprene AC and Neoprene AD available from E. I. Du Pont de Nemours & Co. These latter materials are film formers when deposited from a solvent as opposed to precipitating out of the solvent; as a result they remain miscible with the other three components of the instant adhesive composition after the solvents therein are removed.

From the above various examples and data, one can readily see that the inclusion of a chlorinated aliphatic or aromatic hydrocarbon, or an alkylated polystyrene component in the polyurethane adhesive composition in accordance with this invention provides a joint with high resistance to flexural fatigue, this being an indication also of high joint adhesion. Moreover, and this is an important feature of the invention, improved results are obtained with a wide variety of abrasive material.

While in Examples 2-7 butt joints are assembled and reinforced with a Nomex fabric patch, with the invention adhesive having been applied to the Nomex fabric after having been first formed on a release backing, this may not be the most expeditious method from a mass production point of view. Rather than forming the dry film adhesive on a release backing initially (which can then be used to form either lap or butt joints) and then applying it to the Nomex, the dry film adhesive has been formed directly on the Nomex fabric, thus eliminating a step in the assembly operation. This approach has proven to be a definite cost savings over the method of Examples 2-7 when the invention was put into mass production. Obviously if the quantity of butt jointed belts is small, the advantage of applying the adhesive film directly to the fabric, is trivial.

Although the adhesive films of this invention are particularly useful in the manufacture of coated abrasive belts, the invention is obviously not so limited. The adhesive films disclosed herein, reinforced or not, can be used in the laminating together of various similar or dissimilar materials, e.g., metals such as aluminum, and plastic lamina of various types, e.g., polyester films, as well as wood, cloth and paper lamina.

As many different embodiments of this invention will appear to those skilled in the art of adhesive bonding, it is to be understood that the specific embodiments of the invention, as presented herein, are intended by way of illustration only and are not limiting on the invention. The limitations thereon are to be determined only from the appended claims.

What I claim is:

1. An adhesive composition comprising in admixture:
   (a) a hydroxy terminated polyurethane-polyester having a hydroxyl number of from about 2 to about 15;
   (b) an active hydrogen component containing at least difunctional active hydrogen and having an active hydrogen equivalent weight in the range of from 27 to less than about 500;
   (c) a component having available free isocynate groups; and
   (d) from about 4.8 to about 30% of a component selected from the group consisting of chlorinated aliphatic hydrocarbon, chlorinated aromatic hydrocarbon, alkylated polystyrene, and mixtures thereof, said component being miscible with components (a), (b) and (c).

2. The adhesive composition of claim 1 wherein said (d) component is a chlorinated aliphatic hydrocarbon which is present in the composition in an amount up to about 30% by weight, based upon the weight of solids in the adhesive composition not including the aliphatic hydrocarbon.

3. The adhesive composition of claim 1 wherein said (d) component is a chlorinated aromatic hydrocarbon which is present in the composition in an amount up to about 30% by weight, based upon the weight of solids in the adhesive composition not including the aromatic hydrocarbon.

4. The adhesive composition of claim 1 wherein said (d) component is an alkylated polystyrene which is present in the composition in an amount up to about 30% by weight, based upon the weight of solids in the adhesive composition not including the alkylated polystyrene.

5. An adhesive film suitable for splicing together various lamina comprising the reaction product of the composition in claim 1 which has been at least partially cured but which can still be activated at a temperature suitable for splicing said lamina together.

6. A preformed adhesive film according to claim 5 in which said active hydrogen containing member has an active hydrogen equivalent weight of from about 67 to about 300.

7. A preformed adhesive film according to claim 6 wherein said hydroxyl terminated polyurethane polyester is the reaction product of a diisocyanate and a hydroxyl terminated polyester of a dicarboxylic acid and a polyhydric alcohol.

8. A preformed adhesive film according to claim 7 wherein the dicarboxylic acid is adipic acid and the polyhydric alcohol is butylene glycol.

9. A preformed adhesive film according to claim 8 wherein said isocyanate component is an isocyanate terminated polyurethane reaction product of a polyhydric alcohol and an isocyanate.

10. A preformed adhesive film according to claim 9 wherein said isocyanate terminated polyurethane is the reaction product of trimethylol propane and toluene diisocyanate.

11. A preformed adhesive film according to claim 5 wherein the chlorinated hydrocarbon contains 70 percent combined chlorine.

* * * * *